United States Patent
Wagner

Patent Number: 5,375,866
Date of Patent: Dec. 27, 1994

[54] EXTENSION AXLE APPARATUS FOR OVER-THE-ROAD TRAILER ASSEMBLY

[76] Inventor: Wilbert A. Wagner, U.S. Hwy. 20, P.O. Box 27, Garden Prairie, Ill. 61038

[21] Appl. No.: 22,691

[22] Filed: Mar. 1, 1993

[51] Int. Cl.$^5$ ............................................. B60D 1/14
[52] U.S. Cl. .................................. 280/405.1; 280/407
[58] Field of Search ................. 280/405.1, 406.1, 407, 280/407.1, 456.1

[56] References Cited

U.S. PATENT DOCUMENTS

| | | | |
|---|---|---|---|
| 3,508,608 | 5/1971 | Grant | 280/405 |
| 4,423,884 | 1/1984 | Gevers | 280/405 |
| 4,705,288 | 11/1987 | Schmidt | 280/405.1 |
| 4,741,549 | 5/1988 | Gevers | 280/405 |

*Primary Examiner*—Mitchell J. Hill
*Assistant Examiner*—Victor E. Johnson
*Attorney, Agent, or Firm*—Andrus, Sceales, Starke & Sawall

[57] ABSTRACT

An extension axle unit for an over-the-road tractor/trailer for carrying earth moving equipment, and other heavy loads includes a rigid connecting beam affixed to the end of the trailer bed. A wheeled support frame is connected to the connecting beam by a parallelogram structure including upper and lower arms, and connects the unit to follow directly behind the trailer. The parallelogram structure is pressurized through hydraulic cylinder units to maintain the extension frame in level relationship to the trailer frame as the tractor/trailer assembly moves over uneven terrain thereby maintaining proper load distribution on the several axles and avoiding and maintaining smooth ride with minimum stress within the trailer and extension assembly. A plurality of hydraulic cylinder units are mounted within the parallelogram structure and pressurized from a hydraulic source to maintain load distribution, with a selected maximum load on the wheels. Various hydraulic valving systems are shown, with an accumulator within the system, to maintain pressure conditions after presetting of the assembly. The assembly includes a free float condition for the hydraulic cylinders under which the extension axle merely follows behind the trailer assembly in the absence of a load on the tractor/trailer assembly. The wheels are self-steering to eliminate any loading of the trailer and tipping of the trailer.

15 Claims, 4 Drawing Sheets

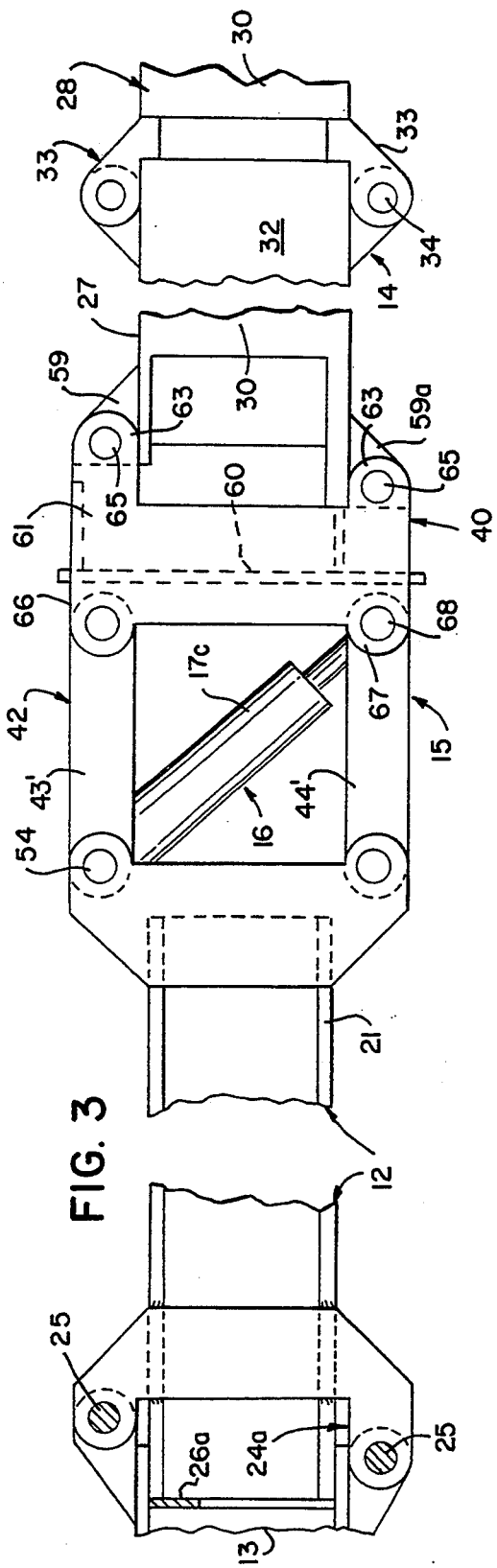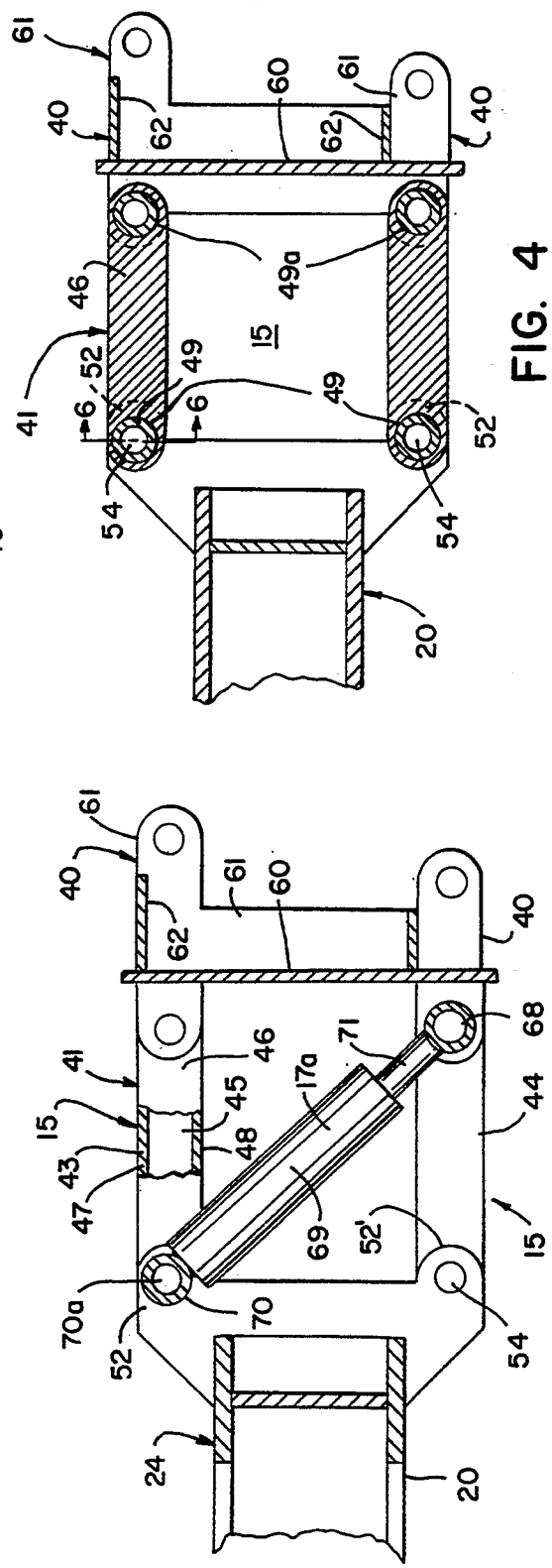

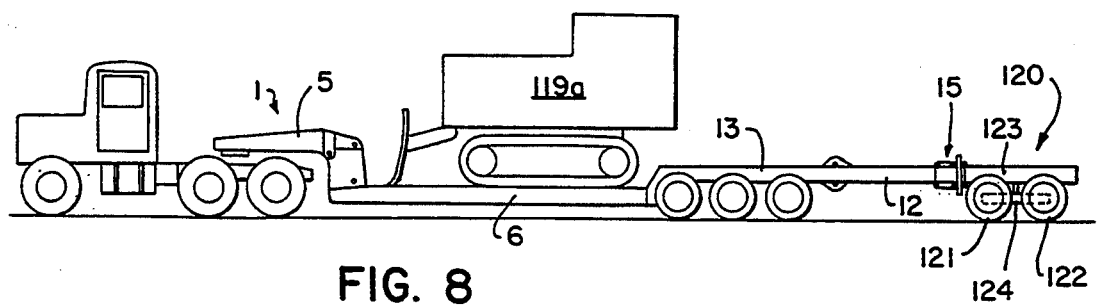
FIG. 8
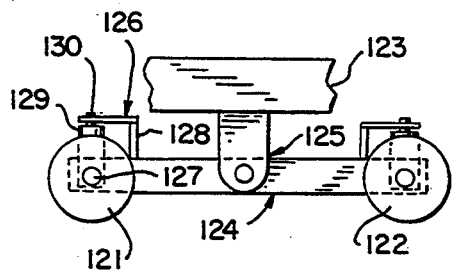
FIG. 9
FIG. 10
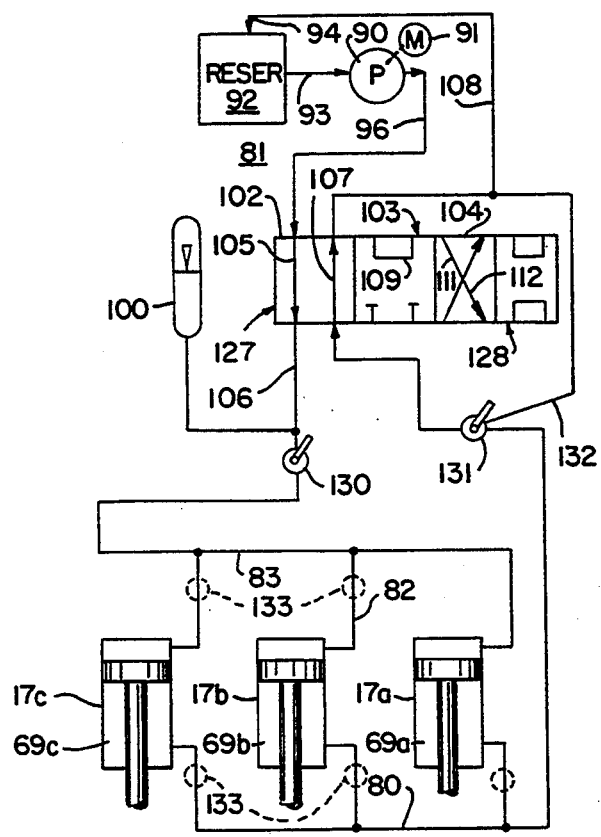
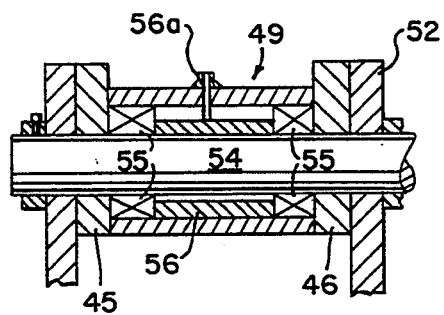
FIG. 6

EXTENSION AXLE APPARATUS FOR OVER-THE-ROAD TRAILER ASSEMBLY

BACKGROUND OF THE PRESENT INVENTION

The present invention relates to over-the-road trailer vehicles for transporting relatively long and heavy loads and more particularly to a special coupling for interconnecting of an auxiliary extension axle apparatus to a main frame of a trailer assembly for supporting and distributing the total load weight throughout additional axles of the main trailer and the extension axle apparatus.

In over-the-road and off-road transport of various long and heavy loads, such as large earth working equipment, building equipment and machinery, building components and other long and heavy loads, a tractor/trailer unit is used. The trailer of the tractor/trailer unit includes a trailer bed for carrying the load which includes a king pin connection at one end for attachment to the main frame of a tractor or other power unit. One or more set of rearwardly spaced and generally tandem rear axles and supporting wheels are secured to the back end of the trailer for supporting the rear of the bed and the load thereon. The weight of the load must be distributed between the various wheeled supports of the tractor and the trailer within governmental established weight limits per axle for over-the-road transport on public roads. With various long and heavy loads, further wheeled support must often be provided for distribution of the overall load weight in order to meet jurisdictional and governmental requirements with respect to axle loading on the roadway. Rather than providing a completely separate trailer structure, the industry has developed load extension axle apparatus to provide for further distribution of the load beyond the rear of the standard trailer.

Various booster or extension axle units have been suggested in the prior art. The prior art devices generally consist of a forward connecting arm member which generally includes a pivotal interconnection of the extension axle unit to the trailing end of the main trailer. The pivotal connection is provided to permit turning of the axle unit relative to the main trailer, and may also permit vertical pivotal movement of the extension axle unit relative to the main trailer. The relative vertical movement of the assembly has to be carefully considered and designed to permit movement of the loaded trailer unit over uneven terrain including ditches, raised or humped portions and the like.

For example, U.S. Pat. No. 4,423,884 issued Jan. 3, 1984 to Gevers discloses a particular axle extender construction including an adjustable pivot connection between a booster axle connecting member and the main frame of the trailer. U.S. Pat. No. 4,741,549 issued May 3, 1988 discloses another extender construction with vertical pivotal turning pin connector. U.S. Pat. No. 3,580,608 which issued May 25, 1971, discloses a direct coupling of a small trailer to a vehicle with a spaced parallel arm assembly to position a trailer relative to the vehicle for pulling a four wheel trailer. The patent discloses the usual pivot hinge connection to a vehicle for pulling of the trailer.

Similarly, certain locations and areas may require air-cushion support for the extender axle wheels but mechanical supports are also often used. The air-cushion support allows convenient vertical orientation of the bed of the extender unit for proper location with respect to the load and the road. Shinning of the load with respect to the extender may be provided in accordance with the relative orientation of the load with respect to the load extender and the distribution requirements. The various requirements and variations in the extender positioning, which is required because of the different loads encountered, have generally required special construction to permit assembly to accommodate the various loads.

Generally, the principle problems which have been encountered with prior art systems involve maintaining the extension axle unit level and with a constant load as the axle unit moves over uneven terrain and actual tipping of the trailer and load during turning of the tractor/trailer assembly. The load characteristic is primarily the need for extension coupling mechanism in which the extension frame is moved to a proper position to carry the load, while the vertical pivot pin coupling for turning creates adverse tipping forces on the trailer assembly during turning of the tractor/trailer assembly can tip the trailer and load onto its side.

Although various suggestions have been incorporated in prior art structures, there is a continuing need for a reliable structure which will provide improved movement of the load over uneven road and terrain environments.

SUMMARY OF THE PRESENT INVENTION

The present invention is particularly directed to an extension axle apparatus having a special built-in knee action support, and particularly with an integrated fluid actuated system such as a hydraulic motor unit for selectively positioning of the wheeled extension frame unit of the extension axle apparatus. In another aspect of the invention, a rigid in-line coupling of the extension axle assembly is combined with self-steering wheels on the assembly to minimize creation of tipping forces. Generally, in accordance with the present invention, a connecting structure such as a beam unit is provided for interconnection of the extension axle apparatus to the main frame of a trailer. A wheeled frame or bed unit is coupled to the connection structure by an hydraulically actuated knee-action unit. Generally, the knee-action unit includes a parallelogram structure interconnecting the trailing end of the connecting structure to the forward end of the extension wheeled unit. An hydraulic motor unit, such as one or more cylinder units, is interconnected to selectively position the parallelogram structure and thereby the wheeled frame relative to the connecting structure and thereby the trailer.

The hydraulic system for operating the hydraulic motor unit in a particularly effective extension construction includes a pressure accumulator to maintain a constant pressure in the system. With the parallelogram structure, the angular position thereof varies the leverage. The accumulator, however, maintains an essentially constant pressure in the system and vice versa.

In one practical aspect of the present invention, the hydraulic actuator system preferably includes a plurality of hydraulic positioning units such as cylinder-piston units for positioning of the wheeled frame unit relative to the trailer. Each of the hydraulic positioning units is similarly interconnected within the parallelogram structure. By providing actuation of various combinations of the hydraulic units, various pressures and preloads are created within the system.

More particularly in a preferred embodiment of the present invention, the extension axle apparatus includes a rigid connecting beam unit, the forward end of which is affixed to the rear end of the trailer frame. The outer end of the beam unit is connected to one end of a parallelogram structure having a horizontal axis of rotation. The extension frame unit is secured to the trailing end of the parallelogram structure and includes a frame or bed with at least one set of wheels appropriately mounted to the frame, which may be mounted with suitable air cushion ride units or with a mechanical wheel mounting to contribute to locating the extension frame in a horizontal level position extending rearwardly the parallelogram structure and the main trailer. In a preferred construction, the parallelogram structure includes a front mounting assembly including a front plate structure connected to the connecting beam unit, such as by welding or the like. The trailer mounting assembly includes upper and lower rearwardly extended pivot brackets welded to the plate structure and extended rearwardly thereof. Upper and lower parallelogram arms are similarly pivoted to the pivot brackets and extend rearwardly therefrom to a frame mounting assembly secured to the forward end of the wheeled frame. The wheeled frame includes a suitable rigid frame with the sets of wheels supporting the frame. A frame mounting bracket is secured to the forward end of the frame and includes side plates which project forwardly and are pinned to a support plate for coupling to the parallelogram structure. The parallelogram structure includes a support plate with pivot brackets projecting rearwardly into overlying mating relationship to the side plates, with a pivotal interconnection therebetween. The parallelogram arms are thus pivotally interconnected by suitable pivot members and define a parallelogram structure for corresponding movement and positioning of the extension frame unit. A plurality of individual hydraulic piston-cylinder units, and preferably three such units, are interconnected between the forward trailer brackets and the frame mounting brackets of the parallelogram structure. The cylinder units are separately connected to a hydraulic power supply through a suitable valve system allowing various combinations of the cylinder units to be activated for positioning of the wheeled frame unit relative to the connecting beam unit and the trailer. The hydraulic system in a preferred construction includes the pressure accumulator such that a constant pressure, equal to that of the initial setting, is maintained with movement of the extension unit over varying terrain.

Each wheeled frame unit may include an air guide or cushion support for each wheel with force means to establish leveling. The system of the present invention however is also readily applicable to a mechanical wheel support system which is preferred where the governmental regulations permit. Similarly, the wheels of the extension axle wheel are preferably self-steering with the fixed mounting of the connecting beam to provide smooth trailing of the axle unit.

The present invention has been found to provide a significant improvement in the interconnection and coupling of an extension axle unit for receiving and supporting an extended load with appropriate proper distribution of the load to accommodate governmental requirements and specifications.

BRIEF DESCRIPTION OF DRAWINGS

The drawings furnished herewith illustrate the best mode presently contemplated for carrying out the invention and are described hereinafter.

In the drawings:

FIG. 3 is an enlarged fragmentary side elevational view of the extension axle unit shown in FIG. 1;

FIG. 4 is a vertical section taken generally on line 4—4 of FIG. 3;

FIG. 5 is a sectional view taken generally on line 5—5 of FIG. 3;

FIG. 6 is an enlarged sectional and fragmentary view of an arm pivot mount of the extension unit shown in FIGS. 1, 2 and 4 and taken generally on line 6—6;

FIG. 8 is a side elevational view of a tractor/trailer assembly illustrating an embodiment of the invention with an extension axle unit with mechanical wheel mounting;

FIG. 9 is a fragmentary diagrammatic view of the extension axle wheel structure shown in FIG. 8; and FIG. 10 is a schematic illustration of an alternative hydraulic system for automatic positioning of the extension axle unit.

DESCRIPTION OF THE ILLUSTRATED EMBODIMENT

Figures 1, 2:
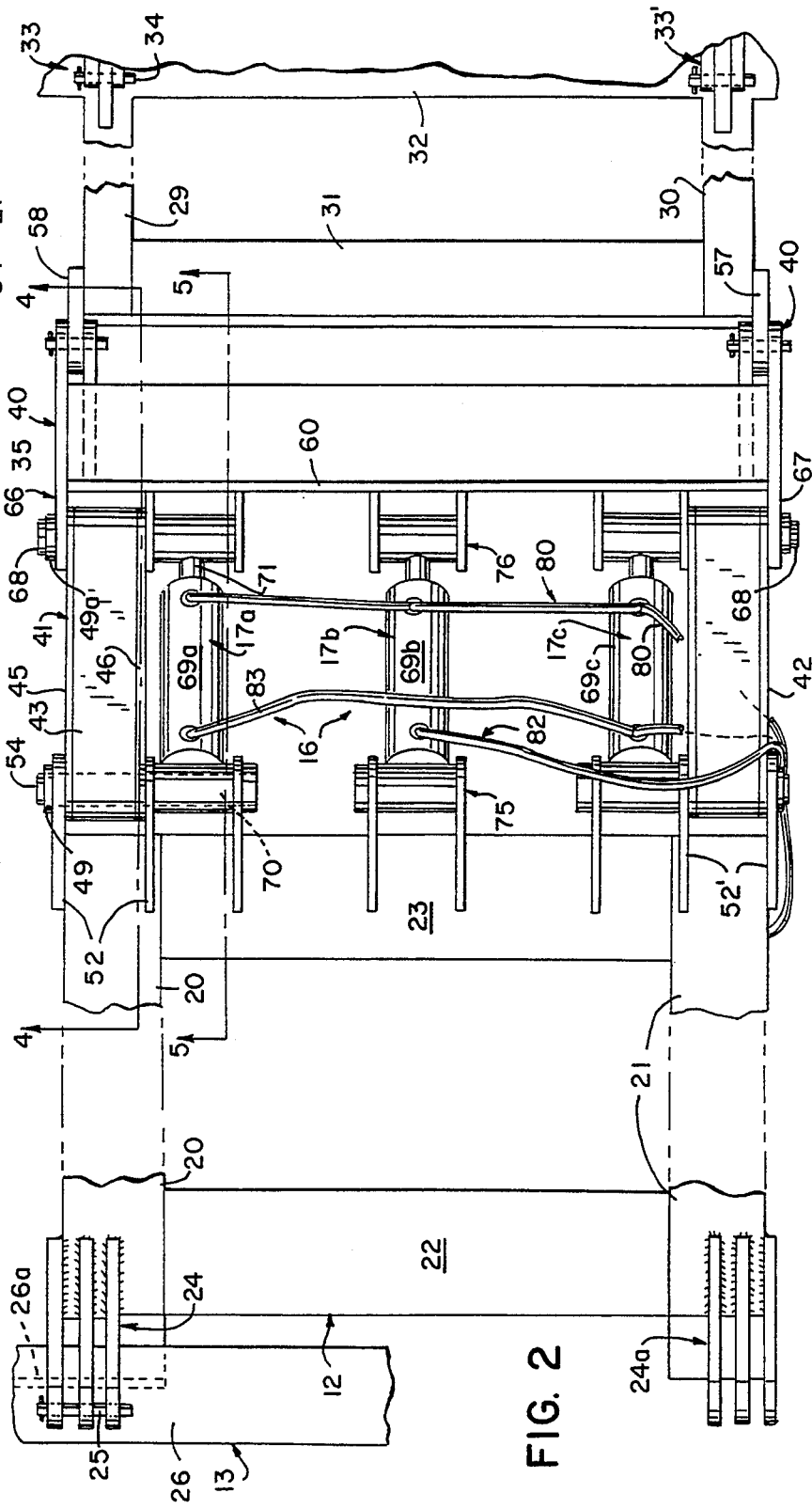
FIG. 1 is a simplified illustration of a tractor/trailer assembly showing an extension axle apparatus constructed in accordance with the teaching of the present invention.
FIG. 2 is a top elevational view of the extension axle unit.

Referring to the drawings and particularly to FIG. 1, a tractor/trailer 1 assembly is shown of a typical construction for transport of heavy machinery and loads for over-the-road transport between various sites. In the illustrated embodiment of the invention, a tractor 2 is provided having a forward wheel support, a rear wheel support and a trailer fifth wheel 3 mounted in accordance with known constructions. A conventional trailer 4 is illustrated including a front gooseneck 5 which extends over the tractor platform and includes a kingpin (not shown) which pivotally and operatively engages the fifth wheel 3. The gooseneck 5 supports the forward end of the trailer bed 6 on the rear of the tractor. The illustrated trailer 4 is a low flatbed construction with the bed 6 extending rearwardly from the L-shaped neck 5 and extended upwardly over a triple wheel axle support unit or assembly 7 at the rear end of the trailer bed.

An extension axle apparatus or assembly 8 constructed in accordance with the teaching of the present invention, is secured to the rearward most end of the main bed and extends rearwardly of the triple wheel axle support 7 for the bed 6, may typically be up to 18 feet in length with current designs, to support heavy extended loads. A typical load 9 on the trailer 4 is diagrammatically illustrated consisting of a plurality of stacked, elongated load elements 10 and 11. The load elements 10 extend from the forward-most end of the frame or bed 6 rearwardly over the triple axle support 7 and then outwardly substantially beyond the outermost end of the trailer bed 6 and into overlying relationship to extension axle assembly 8.

The load elements 10 and 11 are shown supported on the assembly: with an interposed structure 11a between the lower main bed 6 and the forward portion of the beam to provide distribution of the support structure over the bed 6 and between the tractor wheels and the triple axle support 7. The rearwardly extended portions 11b of the load elements 10 and 11 however requires further support in order to provide for safe and authorized over-the-road transport. The extension axle assembly 8 is secured to the rearward end of the trailer bed and extends outwardly beyond the load structure in the illustrated embodiment of the invention. The outer ends of load elements 10 and 11 rest on and supported by the wheeled extension axle assembly 8 to support the extended end of the load. Thus load transfer members 11c are interposed between the assembly 8 and the load elements and provide for an appropriate distribution of the load between the several wheel axles and particularly support 7 and the assembly 8. The distribution establishes a wheel load in accordance with safety, and authorized load limits set by the various interstate and intrastate regulation of wheel load and the like.

The tractor 2 and main trailer 4 may be of any suitable construction and are generally well known. The present invention is particularly directed to the extension axle assembly 8 and its interconnection to the trailer end of the main trailer bed 6. The extension axle assembly 8 is more fully disclosed in FIGS. 2-8 and is more fully described, with the tractor and trailer only further described as necessary to provide a full and clear description of the illustrated embodiment of the invention.

Referring particularly to FIGS. 2 and 3, the extension axle assembly 8 includes a forward connecting arm or beam unit 12 interconnected to the rear crossbeam of the main bed frame 13 of the trailer 4. The beam unit 12 extends rearwardly therefrom, and the rearmost end of the beam unit 12 is connected to the extension frame 14 by a hydraulically positioned parallelogram structure 15. A hydraulic motor unit 16 forms a part of the structure 15 for vertically positioning of the extension axle unit or assembly 8 with respect to the connecting beam and the main frame 13 of the bed 6. The structure 15 provides a knee-action support of the trailer and assembly 8 as it moves over uneven terrain. The hydraulic motor unit 16, shown including as a plurality of hydraulic cylinder units 17, is mounted within and form an integrated part of the parallelogram structure 15. Each cylinder unit 17a, 17b, and 17c extend diagonally in a vertical plane and is similarly interconnected to the upper end of the parallelogram structure 15 at the connecting beam unit 12 and to the lower end of the parallelogram structure 15 at the extension frame 14. Extension of the cylinder unit 17 lowers the parallelogram structure at the extension axle unit 8 relative to the trailer bed 6. Conversely, contraction of the hydraulic cylinder units 17 raises the outer end thereof and therefore the connected end of the extension axle unit 8 relative to the trailer bed.

The hydraulic cylinder units 17, 17b and 17c are connected to a suitable hydraulic source assembly 18, shown in FIG. 6, and may be physically mounted to and within the connecting beam unit 12, with a suitable valving and control system for positioning actuation of the hydraulic units to initially set the extension frame relative to the trailer, as more fully described hereinafter. The hydraulic system further allows expansion and contraction of the hydraulic cylinder units 17, generally as shock absorbing elements, as the trailer extension axle assembly 8 traverses uneven surfaces.

The load 10-11, as illustrated in FIG. 1, extends rearwardly over the connecting beam unit 12, the parallelogram structure 15 and the forward end of the wheel axle unit 8. The outer portion of loads 10-11 is shown transmitted directly to the extension beam unit 12 by the suitable shimming elements 11c between the load and the beam unit 12. This transfers a portion of the load to extension axles and wheels of the extension assembly 8. In many instances, such shimming is not necessary as the load distribution is made through the connecting beam and assembly 8. If the load 10-11 is further elongated to overly the frame, further shimming may be provided to further support the load as well as transfer and distribute the load throughout the longitudinal extent of the tractor/trailer assembly and particularly the various wheeled axles. Such load is well known in the art.

As the tractor/trailer unit 1 moves over the roadway or other surfaces, any depressions or raised portions 12, thus any change in terrain from the level, which are encountered by the trailing end of the load, will result in the load being supported on the rigid beam structure, with the extension frame unit 14 pivoting about the parallelogram structure to follow and maintain an extension of the support to continuously and properly carry the load.

More particularly with reference to FIGS. 1 and 2, in the illustrated embodiment of the invention, the connecting beam unit 12 includes a pair of laterally spaced H-beams 20 and 21 with a strengthening gusset structure 22 secured between the beams at the forward end, and a similar gusset structure 23 similarly secured at the rearward end of the beams.

The forward end of the beam unit includes upper and lower connecting bracket units 24 and 24a, or each arm or beam 20 and 21. Each bracket unit 24 and 24a is similarly constructed and shown as including three spaced brackets. The brackets are welded to the beams 20 and 21 and extend forwardly into interconnected relationship to the frame 13. Thus, the brackets are apertured and vertically spaced coupling pins 25 secure each bracket unit 24 and 24a to a rigid cross beam 26 on the outermost end of the main trailer frame 13. The beam unit 12 is thereby releasably but firmly and fixedly attached as an extension of the main frame 13 such that the load 10-11 on the main frame and the beam are at least partially transmitted to the beam structure and the wheeled assembly 8 beam.

Loading of the trailer can actually bow the trailer bed as a result of the heavy concentrate loading causing the slight gap between the main trailer frame and the connecting beam. This allows the disalignment of the main frame 13 and the extension frame and particularly connecting beam 21. Thus, during the operation it is important to establish the extension unit as an extension of the main trailer and distribution of the load. Air ride constructions alone may not provide for the necessary compensation and, if the load is not appropriately transferred, the trailer bed may bend to extend to break and separate the interconnecting bracket connection between the trailer bed and the assembly 8. Shimming between the abutting upper ends of the main frame 13 and the extension connecting beam 21, as at 26a (FIGS. 2 and 3), to firmly interconnect the elements to each other and connect the extension frame as an extension of the main frame, such that the forces are fully transmitted and carried throughout the system.

This again contributes to the effective reliability of the trailing effect and the effective distribution of the load.

The extension axle unit or assembly 8 is formed with a pair of similar frame units 27 and 26, (FIG. 1) including a forward unit 27 and a rear unit 28 fixedly interconnected to form a dual wheel extension assembly. The units 27 and 28 are similarly constructed to allow end-to-end connection and thus vary in the number of wheel axles in the assembly.

Referring to the forward unit 27, as shown in FIGS. 1, 2 and 3, side I-beams 29 and 30 are secured to each other at the forward and rear end by cross beams 31 and 32. The front beam is generally equal to the width of unit and the rear cross beam 32 extends outwardly to the width of the trailer 4. The centrally located crossbeams 32 and 31 of the units 27 and 28 are bolted together. Coupling ears or brackets 33 are secured to the top and bottom flanges of the several beams 29 and 30 and the related cross beams, and at the center. The brackets overlap with connecting pins 34 releasably secured therein. Each extension unit includes a wheel set 34 for supporting the load. Each wheel set preferably includes an air cushion ride unit, not shown, for leveling the extension frame and establishing a level bed in relationship to the trailer bed for supporting the load in proper over-the-road or ground travel. Such supports are well known and shown in the prior art. The two connected units 27 and 28 form the dual wheel set as shown. The multiple sectioned assembly allows construction of the extension assembly 8 with one or more separate wheel support firmly interconnected to produce the decreased axle support. Additional extension axle units of the same construction, not shown, could be connected to the first and second axle units of the illustrated assembly 8; for example, to provide a triple wheel extension unit.

The extension unit 8 is also mounted with a self-steering wheel assembly, such as shown for the second embodiment (FIG. 9), with a suitable self-steering mechanism provided within the wheeled unit of assembly 8. This structure is well known in the art and no further description thereof is necessary or desirable, other than as set forth with respect to the second embodiment.

The forward support 27 is connected by a connection unit 40 to the parallelogram structure 15 while the forward end of the parallelogram structure is connected directly to the rearwardmost or back end of the connecting beam unit 12.

As shown most clearly in FIGS. 2-5, the parallelogram structure 15 includes laterally spaced parallelogram units 41 and 42 secured in parallel connection between the extension axle frame of unit 27 and the connecting beam unit 12. Each parallelogram unit 41 and 42 is identically constructed, as illustrated in FIGS. 2, 3 and 4. Unit 41 is described for purposes of explanation and corresponding elements of the second parallelogram unit 42 are identified by corresponding primed numbers, for simplicity and clarity of description.

Thus, the parallelogram unit 41 includes vertically spaced top and bottom arms 43 and 44 which are of equal length and construction. Referring to the top arm 43, it has a box-like cross-section formed by laterally spaced plates 45 and 46 which are interconnected to each other by top and bottom plates 47 and 48, with the parts welded to each other to establish a rigid tubular arm. Bearing hub members 49 and 49a are secured as by welds within the arm and between the side plates 45 and 46 at the opposite ends of the arm. The arms 43 and 44 are pivotally mounted at the forward end by the pivot bearing hub members 49 to beam unit 12 and at the rearward end by the bearing hub 49a to the connector unit 40 and thereby extension frame 27.

The connection of the cylinder units to beam unit 12 includes bracket members welded to the laterally spaced beams 20-21 of unit 12 and projecting rearwardly therefrom. The bracket member at beam 20-21 includes spaced pivot brackets 52 welded to the top plates of the beam. Pivot brackets 52 are spaced slightly in excess of the width of the arm 43. Pivot pins 54 extend through the pivot brackets 52 and the bearing hub 49 to pivotally support the parallelogram arm to the beam unit 12. A grease fitting is provided in each hub member for periodic greasing of each pivot connection. As shown in FIG. 6, the pin 54 is journaled within axially spaced radial rotary bearings 55 within the opposite ends of hub 49.

A spacer 56 is located between the radial bearings 55 and confined between the side wall 45-46 of the arms. The radial bearings are used and provided with a greased fitting 56a. This provides a firm, reliable support of each end of the arms and essentially eliminates all twisting or wobble, even though substantial forces may be created on the arms.

The cylinder unit, as described hereinafter, includes simple sleeves-type bearings. They do not appear to be subjected to the same type of the load characteristics and having generally been found to operate satisfactory.

The trailing end of arms 43 and 44 are similarly connected to the connector unit 40 for coupling to the forward end of the wheel frame as follows.

Referring to FIGS. 2, 3 and 4, bracket plates 57 and 58 are welded to the outer front sides of the extension frame 14 of assembly 8 for coupling to the parallelogram structure as follows. Each bracket is similarly constructed. Referring to bracket 57, top and bottom ears 59 and 59a extend above and below the frame and project forwardly for interconnection to the connector unit 40 and thereby securement to the parallelogram structure 15.

The connector unit 40 includes a vertical mounted plate 60 with spaced side pivot brackets 61 welded to the back side thereof and strengthening cross plates 62. The pivot brackets 61 are spaced for alignment with the brackets 59 and 59a, and each include vertically spaced and rearwardly projecting arms 63 in accordance with the thickness of the pivot ears 59 and 59a of the assembly 8. The aligned arms and ears are similarly apertured and located in telescopic alignment to receive aligned coupling pins 65 which lock the connector unit 40 to the forward end of the extension frame 14.

The mount plate 60 is thus supported in a vertical orientation with respect to the extension frame 14 for coupling to the arms of the parallelogram structure 15. Pairs of apertured pivot brackets 66 and 67 are secured to the forward side of the vertical mount plate 60, and laterally spaced in accordance with the spacing of the parallel arms 41 and 42 of the structure 15. The hubs 49a of the arms 41 and 42 are pinned to the brackets as at 68.

The parallelogram structure 15 is supported by the hydraulic assembly 16, as follows. The hydraulic assembly 16 includes the three hydraulic positioning cylinder units 17a, 17b and 17c mounted between the laterally spaced parallelogram units 41 and 42 and in lateral parallel relationship. Two hydraulic cylinder units 17a and 17c are located immediately adjacent to the inner side of the parallelogram units 41 and 42 respectively and hydraulic cylinder unit 17b is located centrally therebetween.

The several hydraulic cylinder units 17 are essentially identically mounted at the opposite ends to the respective ends of the parallelogram structure. Referring particularly to the end hydraulic cylinder unit 17a, a cylinder 69 has a closed base with a bearing hub 70 welded thereto and pivotally connected as by a pin 70a forming an extension of the pivot pin 54 for the parallelogram structure and particularly the upper end arm hub 49 and thus in alignment with the top connection of the parallelogram arm 43. A piston rod 71 projects outwardly from the bottom end of the cylinder 69 toward the bottom end of the parallelogram structure 15 and is pivotally connected to the mount plate 60 of connector unit 40 in alignment with the bottom connection hub 49a of the bottom parallelogram arm 44, and by an extension of the pivot pin.

Unit 17c is similarly mounted to the parallelogram unit 42. The center cylinder unit 17b is similarly secured in parallel relation to units 17a and 17c to the respective mounting assemblies by bearing bracket units 75 and 76 provided in the appropriate center alignment of the assembly 8 and parallelogram structure 15.

Each of the hydraulic cylinders of units 17a–17c is coupled to a hydraulic source through a valved control assembly 77 shown diagrammatically mounted to the one side of the connecting beam units 12. The assembly 77 is more fully discussed in connection with the schematic hydraulic system shown in and described in connection with FIG. 6.

Figure 7:
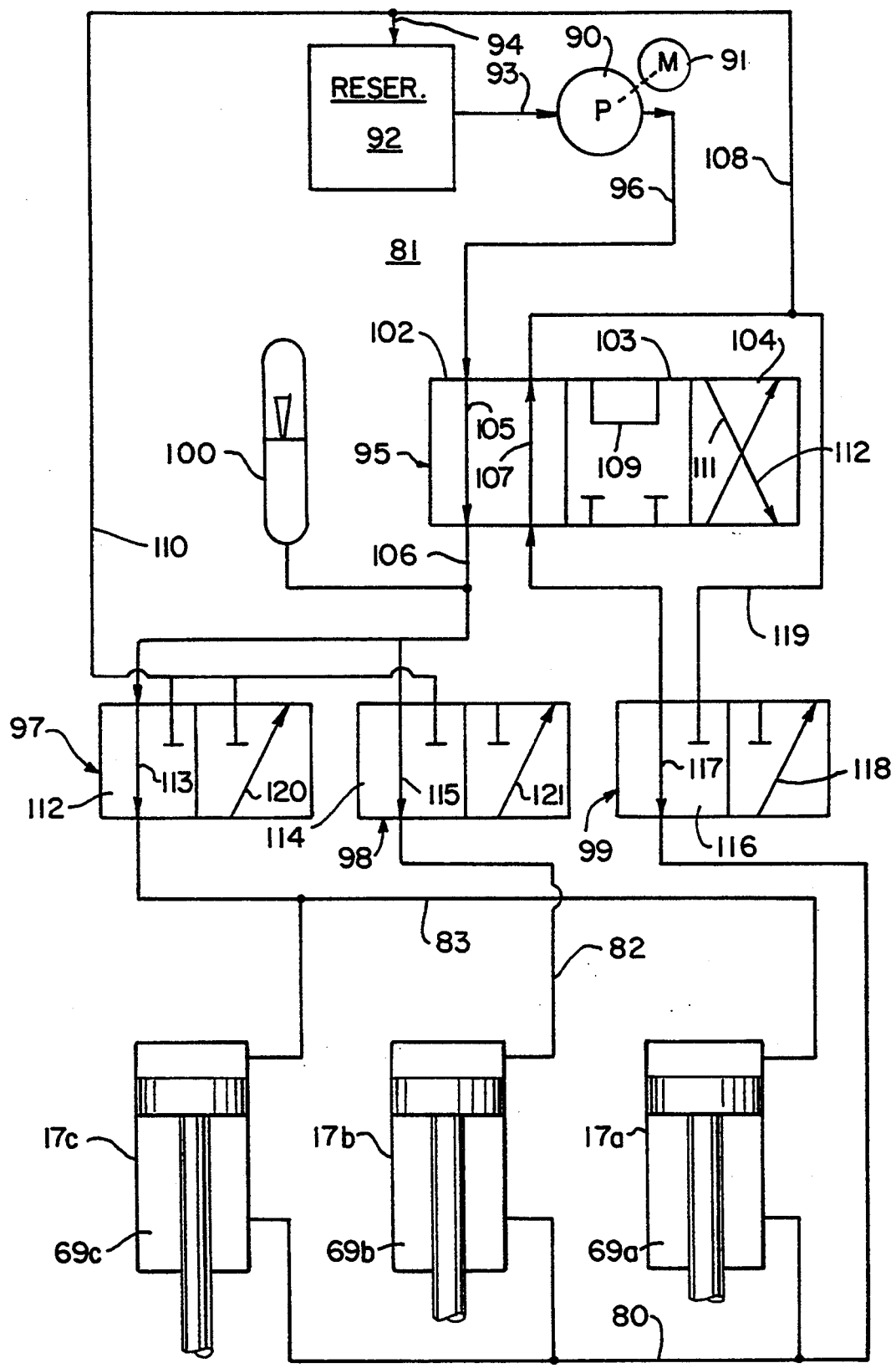
FIG. 7 is a schematic illustration of a hydraulic system for operating and positioning the elements shown in the illustrated embodiment of the invention.

As schematically shown in FIG. 2 and FIG. 7, the lower ends of the three cylinder units 17a–17c are connected in common to source line 80 from one side of a pressurized hydraulic source 81. The upper end of the central cylinder unit 17b is connected directly to a source line 82, from the second side of source 81. The upper ends of the outer cylinder units 17a and 17b are interconnected to each other by a common source line 83 to the hydraulic source 81 and thus in parallel with each other. This permits the actuation of one, two or three of the cylinder units. In one typical application, each cylinder may create a load of 2000 pounds. If cylinder 17c is only actuated, a 2000 pound pressure load is created. If both cylinder 17a and 17c are only actuated, a 4000 pound pressure load is crated. Actuation of all three cylinder units produces the maximum load of 6000 pounds.

The various pneumatic and other control lines for the extension axle assembly or apparatus may be located within the parallelogram structure and passed through the one side parallelogram structure 15 to the connecting beam unit and therethrough to the main trailer for actuation of the hydraulic cylinder air cushion rides and the like.

In use, where an extended axle is required, one or more wheel axle units 27 and 28 are interconnected to each other as illustrated, with the forwardmost unit interconnected to the connecting beam unit 16 by the parallelogram structure 15. Depending upon the load structure, the hydraulic cylinders 17a–17c are actuated in proper combination to position the forward end of the extension axle assembly: in the desired location with respect to the connecting beam unit 16 and the main trailer frame 6. In an actual embodiment of the present invention, the main trailer bed 6 had a length of 24 feet while the axle extension assembly included a connecting beam unit of 17 feet 7 inches, and axle extension unit 8 had a length of 9 feet. The parallelogram structure was 2 feet long and establishing an overall length from the forward end of the trailer kingpin to the rearmost end of the trailer including the axle extension assembly 8 of about 71 feet. The rearmost wheel axles of the trailer to the frontmost axle of assembly 8 is approximately 14 feet to provide a proper load distribution.

Air cushion units are normally provided for the several wheels of the trailer assembly and provide independent leveling of the suspension and the frame structure to provide the desired interrelationship during over-the-road travel, as well as to facilitate interconnection of the trailer and extension axle assembly to the main trailer and to each other. Thus disconnected, the parallelogram structure 15 can be extended to lower the connecting beam unit to the ground relative to the extension frame structure.

Referring to FIG. 7, a schematic hydraulic system is shown for actuating the hydraulic cylinder units 17a, 17b and 17c. The hydraulic fluid source 81 includes hydraulic pump 90 which is driven by a suitable power from the tractor drive 91. A hydraulic fluid reservoir tank 92 container has an outlet line 93 connected to the inlet side of the pump 90. A return line 94 to the tank 92 provides for circulation of hydraulic fluid from the tank through the system.

A three position main valve 95 is connected to the output side line 96 from the pump for selectively disconnecting the hydraulic cylinder circuit to the pump. A four position valve may also be used. The valve 95 is settable to (1) circulate fluid from and immediately back to the tank, (2) power the cylinder to expand the piston rod and (3) power the cylinders to reverse and contract the cylinders.

Three two-position control valves 97, 95 and 99 are provided. Valve 97 provides for activating of the cylinders 17a and 17c via line 83. The second valve 98 provides for activating of the cylinder 17b via line 82 while the third control valve 99 selectively connects the pressure or return side of the pump to connect the flow from valve 95 to contract all three cylinder units via line 80 or to complete the return system when the cylinder units are expanded.

In addition, in the illustrated system, a pressure accumulator 100 is connected to the high pressure side of the pump 96 to the output side of valve 95. The accumulator 100 maintains a controlled and constant pressure on the expanded cylinder units 17 while allowing knee-action type response and movement between the connecting beam and the wheeled assembly 8 with variation in the ground level during over-the-road movement of the trailer assembly.

More particularly, the pump output line 96 and a main return line 101 from the valve 95 are coupled to a pair of main ports of the three position interlock valve 95. The interlock valve 95 has the three sections including a cylinder power section 102, a circulating section 103 and a cylinder retract section 104. The powered section 102 has an output passage 105. An output line 106 is connected to the accumulator 100 and to the input port of the first two position valves 97 and 98 for selectively supplying actuating fluid to the cylinders 17a and 17c and/or 17b. The power section includes a return passageway 107 connected to a second output port for connection to a return line 108 for selective return of the fluid back to the tank line 94, or providing for a reverse flow for opposite actuation of the cylinder units.

The center section 103 of the three-day valve 95 has a return line aligned with the inlet and outlet ports. When the valve is shifted to that position, the fluid is recirculated directly from the pump to the tank via line 109. The output ports are closed and the hydraulic system may be locked in place or the position valves 97 and 98 may be set to permit return of fluid to the tank 94 from the cylinder via a line 110.

The third section 104 of the valve 95 is a reverse valve having passages 111 and 112 which crisscross the interconnection between the pump lines 96 and 108 and the cylinder lines 106 to provide power via the valve 9 to the rod side of the cylinders units, with the other two position valves 97 and 98 set to allow return of fluid to the tank 92 via line 110.

Referring to the two position valve 97, a first section 112 has a passageway 113 connecting the cylinder line 106 to the common power line 83 for the cylinders 17a and 17c. With the valve 95 in the power position and the two position valve 97 in the power position, hydraulic fluid is supplied to the piston side of the cylinders 17a and 17c causing expansion and outward movement of the piston and the interconnected rod to effectively raise the parallelogram structure with respect to axle extension assembly 8. The second two position valve 98 for the cylinder 17b has a similar section 114 with a passageway 115 connecting an inlet port to the common power line 106 from the interlock valve 95 to the outlet line 82 connected to the cylinder 17b.

The return valve 99 has a first section 116 with a passageway 117 interconnecting an outlet port connected to the line 80. Thus, in the power position, valve 99 connects bottom side of the cylinders and particularly line 80 to passage 107 of valve 95 and thus to the return line 108 to the tank 92. The valve 99 has an alternate position with a cross passageway 118 which interconnects the return line 108 to an alternate port and to a second return line 119 connected to line 108 and thus directly back to the return side of the tank 92. This alternate position may be used when the interlock valve is in the center position to lock the units to prevent activation of the cylinder units, cylinder assembly or power unit 16.

With the interlock valve set in the reversed position and supplying power to the bottom or rod side of the cylinders 17, the two position valves 97 and 98 are located in their alternate position. In the alternate positions, each valve 97 and 98 has a cross passage 120 and 121, respectively, interconnects the line 83 and/or line 82 to a valve port connected in common to return line 110 from the respective valves back to the return line and side of the tank 92. This allows the powered collapse of the cylinder units and the dropping of the connecting extension unit beam in a controlled manner with the assembly decoupled from the trailer.

In the activating position, as previously noted, the accumulator 100 is coupled to the pressure side of the cylinder units, in particular in the piston side. As the tractor is moving over the roadway, any difference in road level between the main trailer and the extension assembly 8 will require relative vertical movement therebetween. Such action is readily provided by the hydraulic action of the hydraulic cylinders, with the fluid moving into and from the accumulator as required to maintain the desired pressurized condition on the assembly and maintain support of the load at all times.

In summary, the interlock valve 95, which in a typical system is biased to the center position; is set in any one of the three positions, the first actuated position of which provides for expansion of the cylinder units 17 and positioning of the connecting beam 12 relative to the wheeled assembly 8.

One or both of the two position valves are set in the position to supply fluid to the head side of the cylinder 17a and 17c and/or 17b with return through the third valve 99. Actuation of both two position valves 97 and 98 provides for a maximum pressure. Actuation of the position valve 97 alone results in actuation of only cylinder 17a and 17c and a 4000 pound load. Similar actuation of valve 98 only results in a 2000 pound load.

For reverse positioning and total collapse of the cylinder units, the interlock valve is set to the third position, and the valve 99 is set to the alternate position. This provides for supplying power to the rod side of the cylinder units and return of fluid through the two position valves.

In certain applications, a simplified hydraulic system is desirable in which the several cylinders are simultaneously actuated with variations in pressure provided by the source pressure applied to the head side of the cylinder with the rod side of the cylinder allowed to float. In such a structure, the multiple two-way position valves can be eliminated for the selective combining of the loads or replaced with simple valves provided in the connection to the several cylinders. The system minimizes the skill and attention required to setting the system for proper load distribution. Such a system is generally shown in FIG. 1 for operating a parallelogram structure of an alternate embodiment of assembly 8, as shown in FIGS. 8, 9 and 10.

The corresponding elements of the drawing shown in FIG. 10, which may correspond to the structure and function of those elements shown in FIG. 7, are correspondingly numbered for simplicity and clarity of description and comparison.

Referring to FIG. 8, the alternate embodiment of an extension axle assembly 8 is illustrated coupled to a tractor/trailer unit 1. The tractor/trailer unit 1 is shown in FIG. 1 with an earth moving machine 119a mounted on the main trailer. The load of the machine is such that the axle assembly is needed to distribute the load and prevent an authorized road loading of wheel axle of the tractor/trailer unit.

In the alternate embodiment, the wheels are supported with a mechanical suspension of a known walking beam construction interconnecting the axles of the spaced wheels of the extension axle.

In the embodiment of FIGS. 8–10, the main tractor/trailer unit is illustrated as in FIG. 1 and corresponding elements are similarly numbered for simplicity and clarity of description and explanation. Rather than an extended load, a single concentrated load on the trailer bed 6 is diagrammatically shown as having earth moving grader. The total load may be such that an axle extension unit 120 is necessary to properly distribute the load and reduce the loading on the tractor wheels and trailer wheels. Thus, as is well known, the load will be distributed throughout the several illustrated wheel axles.

In the alternate embodiment, the axle extension unit 120 is a dual wheel unit having the front and rear wheels 121–122 on a single frame 123. The wheels are supported by a walking beam 124 and providing the mechanical support of the trailing unit and are self-steering, as presently described.

A walking beam support is a well known mechanical support and is diagrammatically shown in FIG. 9. Thus, the beam 124 is a rigid beam pivotally mounted to the underside of single frame 123, as at 125. The wheels 121 and 122 are mounted to the opposite ends thereof and support the frame and the load distribution from the trailer.

The frame 123 is fixed to the parallelogram structure, as in the first embodiment, or other structure 15 providing similar support. The assembly 120 also includes the rigid connecting beam unit 12, or other similar structure to form a rigid extension of the trailer bed frame, with knee action of the parallelogram structure establishing the proper leveling of the assembly with uneven terrain for proper load transfer and support.

To maintain proper turning action, the extension assembly includes a suitable self-steering mounting of the individual wheels to the walking beam 124. Wheel 122 is referenced for describing the wheel mountings.

A king pin unit 126 is secured to the wheel axle 127 and beam 124. A pivot support 128 is secured to the beam 124 and projects upwardly and outwardly over the beam. The wheel bracket 129 is secured to axle 127 and has a pivot pin 130 journaled in support 128. The unit 126 thus provides a known offset construction permitting similar turning of the wheels as the trailer and connecting beam moves and turns. This, of course, eliminates the need for any pivot connection within the extension axle unit such as widely used in the prior art.

The hydraulic system for operating the illustrated embodiment of FIG. 8 is shown in FIG. 10.

Referring particularly to FIG. 10, the source 81 may be identical to that with previously provided accumulator 100 and which is coupled into the system. A four position valve is provided for connecting the hydraulic source to the three cylinders directly for raising or lowering thereof.

In FIG. 10, a four way valve 127 includes valve sections 102, 103 and 104 which are interconnected to the source 81, which provides similar functioning for locating of the cylinder units 17. A fourth section 128 provides for establishing a complete floating of cylinders. Thus, the pressure is removed from both sides of each cylinder and in addition, both sides are coupled directly to the tank 92 and provide a complete floating of the three cylinder units. Thus, both sides of the cylinder now float and the trailing unit is secured without any pressurization on the trailing unit. This condition is generally desirable when the system is operating without a trailer load.

This simplified unit minimizes the cost and functioning and the degree of skill required to control the unit and further provides for complete release of the load on the trailing assembly. Consequently, when there is no load on the trailing unit, it can travel over the road and follow the trailer directly without the necessity of special steering controls.

This is particularly important with a mechanical support structure of the trailing unit.

More particularly, in the new embodiment of FIG. 10, the output of the four way valve is thus connected directly to the three pistons. The output of section 102 has its pressure line 106 connected directly to the accumulator 100 and to line 83. In this simplified embodiment, line 83 is connected to all three cylinders including cylinder 17b as shown. The output side of the cylinders or rod side of each of the cylinders 17a through 17c is in turn connected directly back to the reservoir tank 92 via line 80 and section 102 of valve 127. The system is thus set to a desired pressure condition with the load in place. The four-way valve is then in position to lock the hydraulic cylinders in position.

In addition, in the present invention, a separate locking valve 130 is connected in line 83 to the pressure side of the accumulator 100. It thus locks the system against possible leakage associated with the four-way valve unit 127. Thus, such valves are presently machined and are not generally provided with appropriate O-ring seals and the like to establish a high pressure seal such as desired in the present application.

Additionally, a separate valve 131 is provided in the rod side line 80 from the three cylinders between three cylinders and the fourth position valve and also to the reservoir 92 via a line 132. The valve 131 is set to directly connect the rod side line 80 to tank 92 and to float with the system set and loaded.

For example, in a typical application using a two axle trailing unit with the mechanical wheel support, the inventor has found that by pressurizing of the cylinder units to the level of slightly above 1400 pounds per square inch (PSI) each of the axles will carry a load of just under 20,000 pounds or substantially 19,300 pounds of pressure on each axle. This is well within essentially all governmental load axle regulations and provides a highly effective and responsive system.

With the load completely removed from the trailer and thus the extension axle unit 120, the valve 127 is set to couple section 128 to the cylinder line 106 and 80 and valve 131 connects line 80 directly to tank 92. Section 128 thereby connects both lines to the reservoir tank 92 and both sides of the cylinder thereto such that the cylinder operates in a free flow state. This provides a safe and effective mode for over-the-road travel when the load is removed from the extension axle unit.

In the system providing for the simultaneous similar operation of all of the cylinder units, alternates can of course be incorporated without the necessity of the various two position valves as shown in FIG. 7. Thus, as shown in phantom in FIG. 10, simple on/off valves 133 may be connected to the opposite sides of each of the cylinders, or only certain thereof, in the connections between the cylinder head and the rod end of the cylinders to lines 83 and 80. Thus, anyone or more of the cylinder units can be selectively connected into circuit. This is merely shown as a possible alternative. The inventor having found through extensive experience that the simpler system where you pressurized all three of the cylinder units to an appropriate level, and then set the cylinders in such operative condition with the load acting on the piston rod side produces a highly effective and simplified operation, and the alternatives are described to fully disclose the scope of the present teaching.

The present invention provides a rugged and highly efficient connection of an extension axle apparatus to a trailer for distributing of elongated heavy loads over additional wheel supports. The system maintains proper leveling of the extension axle frame for continuous load distribution, and essentially eliminates tipping of the trailer and load.

Various modes of carrying out the invention are contemplated as being within the scope of the following claims particularly pointing out and distinctly claiming the subject matter which is regarded as the invention.

I claim:

1. An extension axle apparatus for extending of a trailer unit having a wheeled main frame, comprising an extension frame having a front end and a back end, at least one auxiliary wheel axle unit secured to said extension frame and operable to support the extension frame for over-the-road travel, a connecting unit having a front end for interconnection to said main frame and having a back end, a parallelogram structure secured to said back end of said connecting unit and to the front end of said extension frame, said parallelogram structure including vertically spaced parallelogram arm members extending longitudinally of said main frame and said extension frame and being pivotally coupled to the connecting unit and to the extension frame and thereby permitting vertical movement and positioning of the extension frame, and a power unit interconnected to said parallelogram structure for positioning of said parallelogram structure and thereby positioning of said extension frame relative to said main frame, said power unit including at least first and second elements having a first position with the extension frame and said main frame in a selected position and moving relative to each other from said first position in response to loads on said main frame and said extension frame and permitting movement of said parallelogram structure in response to relative vertical movement between said main frame and said extension frame.

2. The extension axle apparatus of claim 1, wherein said extension axle includes a self-steering wheel apparatus.

3. The extension axle apparatus of claim 1, wherein said power unit includes a plurality of hydraulic cylinder units connected for expansion and contraction, and a hydraulic source connected to supply hydraulic fluid to said cylinder units and including selective connectors to separately actuate said cylinder units.

4. The extension axle apparatus of claim 1, wherein said parallelogram structure includes laterally spaced parallelogram units each of which includes upper and lower parallelogram arms having first and second ends, said upper arms and said lower arms being maintained in laterally spaced parallel orientation with ends of the arms aligned, separate common pivot support units connected to each of the aligned ends of said arms and connecting the first end of said arms to said connecting unit and the second end of said arms to said extension frame.

5. The apparatus of claim 4, wherein said power unit includes a plurality of at least three hydraulic cylinder units each having a first end and a second end and located between said laterally spaced parallelogram units and including a centrally located hydraulic cylinder unit centrally located between said parallelogram units and a pair of end hydraulic cylinder units located one each adjacent the first and second parallelogram units, a hydraulic source connector, each of said cylinder units having said first end connected in common to said hydraulic source connector, the center hydraulic cylinder unit having said second end separately connected to said hydraulic source connector, said pair of end hydraulic cylinder units each having said second end connected in common to each other and to said hydraulic source connector, and a valve control system for selectively opening and closing the connections to the hydraulic source connector.

6. An extension axle unit for connection to a main trailer having a trailing end, comprising a wheeled axle extension frame for connection to the trailing end of the main trailer, a knee-action supporting unit including a shock absorbing unit interconnected between said extension frame and said main trailer to interconnect the wheeled axle extension frame to said trailer and establish relative vertical movement between said extension frame and said trailer and establish and maintain a substantially parallel horizontal extension between the trailer and frame with movement vertically over uneven surfaces, wherein said knee-action unit includes a hydraulic motor unit for selective vertical positioning of said extension frame relative to said trailer, said motor unit including said shock absorbing unit for establishing said relative vertical movement, and said knee-action unit includes a parallelogram structure with vertically spaced arms, each arm having a first end connected to said extension frame and a second end connected to said main trailer, and said hydraulic motor unit is connected to position said parallelogram structure in an initial start position and thereby the relative position of said frame relative to said trailer.

7. An extension axle apparatus for an over-the-road tractor trailer assembly movable over varying terrain, comprising a wheeled support frame having a front end and a rear end, a plurality of laterally spaced support wheel units between said front end and said rear end of said frame for supporting said frame for movement over the terrain, a walking beam support attached to said frame, a steering king pin unit secured to the walking beam and to at least one of said wheel units to establish a free steering wheel unit, a parallelogram structure having a front end for connection to said trailer assembly and a rear end secured to the front end of said support frame and supporting said support frame for vertical movement relative to the terrain and said trailer assembly, said parallelogram structure including at least one parallelogram unit having a front mounting pivot bracket unit secured to said connecting beam and a rear mounting pivot bracket unit secured to said frame, said parallelogram unit having an upper arm, a lower arm, and pivot units securing said arms to said bracket units, a rigid connecting beam unit fixed to the front end of said parallelogram structure and defining a fixed support at the front end of said parallelogram structure, and said beam unit having a front end, a fixed attachment unit secured to the front end of said connecting beam unit for fixed connection to said trailer assembly and establishing in-line movement of the connecting beam unit and said trailer assembly, said wheel units including said steering wheel unit providing the sole support permitting terrain movement of said connecting beam unit and said wheeled support frame, and a motor unit connected to said parallelogram structure and operable to load said parallelogram structure and maintain said support frame in level orientation related to said trailer for selected trailer loads.

8. The extension axle apparatus of claim 7, wherein said parallelogram structure includes first and second parallelogram units spaced laterally between said wheel units, each parallelogram unit including a front mounting pivot bracket unit secured to said connecting beam and a rear mounting pivot bracket unit secured to said frame, each parallelogram unit having an upper arm and a lower arm, pivot units securing said arms to said bracket units, said front mounting pivot bracket unit forming an integral part of said connecting beam unit and moving in-line with said connecting beam unit, said rear mounting pivot bracket unit forming an integral part of said frame and moving in-line with said frame.

9. The extension axle apparatus of claim 8 wherein said rear mounting pivot bracket unit includes a first rigid plate unit with pivot members pinned to said upper and lower arms and having rearwardly extended brackets, said frame having bracket secured to the front of said frame and fixed to said rearwardly extended brackets.

10. The extension axle apparatus of claim 7 wherein said motor unit includes an inactive state operatively removing of the motor unit from said parallelogram structure.

11. The apparatus of claim 8 wherein said motor unit includes a plurality of hydraulic cylinder units, each of said cylinder units including a linear cylinder and piston rod connected respectively to the upper arm and to the lower arm, and a pressurized hydraulic source connected to actuate said cylinder units.

12. The apparatus of claim 11 including valve units connected between said source and said cylinder units to selectively set said cylinders to a selected load pressure to support the load.

13. The apparatus of claim 12 including a control system for adjusting said valve units to lower said connecting beam unit and alternatively to allow said hydraulic units to freely float with pressure removed from both sides of each cylinder unit.

14. The apparatus of claim 11 including a control system having valve units to connect all hydraulic cylinders in parallel to said hydraulic source.

15. The apparatus of claim 14 wherein said control system includes valve units to selectively disconnect selected hydraulic cylinders from said source.

* * * * *